Nov. 29, 1960 P. BEEN 2,961,748
METHOD OF MAKING TURBINE DIAPHRAGM ELEMENT HAVING A HUB AND
SHROUD FORMED FROM A SINGLE PIECE
Filed Jan. 10, 1955

Inventor
Paul Been
by Arthur M. Strich
Attorney

United States Patent Office 2,961,748
Patented Nov. 29, 1960

2,961,748

METHOD OF MAKING TURBINE DIAPHRAGM ELEMENT HAVING A HUB AND SHROUD FORMED FROM A SINGLE PIECE

Paul Been, Grantsburg, Wis., assignor to Allis-Chalmers Manufacturing Company, Milwaukee, Wis.

Filed Jan. 10, 1955, Ser. No. 480,810

1 Claim. (Cl. 29—156.8)

This invention relates generally to fluid passage defining structures and may be considered especially applicable to diaphragms for elastic fluid turbines of the impulse type.

The current practice for making fluid passage defining structures such as diaphragms for elastic fluid turbines of the impulse type usually involves the making of individual fluid passage defining elements and welding such elements to a previously prepared member having an outer surface defining at least a portion of a circle. A substantial portion of the cost of making such a structure results from the hours of manual labor required to perform the machining operations necessary to prepare such a member and to perform various welding and machining operations necessary to secure the elements to the member and produce a completed structure. Factors that affect the number of hours required to do such work include the number of operations to be performed and the degree of skill and care required to produce an acceptable structure. The principal object of the present invention is to reduce the cost of manufacturing fluid passage defining structures by providing a new and improved method requiring less skill and care that is faster and less expensive than any method heretofore known to those skilled in this art.

Objects and advantages other than those above set forth will be apparent as the description of the invention proceeds.

The novel features of the invention and how the objects are attained will appear from the specification and the accompanying drawings forming a part of this application and all these novel features are intended to be pointed out in the claim.

Figure 1:
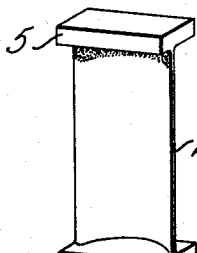
Fig. 1 is a view of a fluid passage defining element often used to make fluid passage defining structures such as diaphragms for steam turbines of the impulse type.
Figure 2:
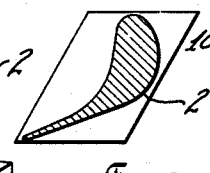
Fig. 2 is a view taken along lines II—II of Fig. 3.
Figure 3:
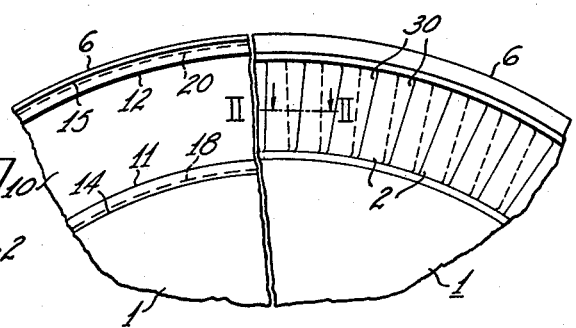
Fig. 3 is a fragmentary view, one half of the view showing a portion of a member prepared for use in a method of making a diaphragm and the other half of the view showing a portion of a completed diaphragm for an impulse turbine.

Referring to the drawing, to produce an article such as a diaphragm for an elastic fluid turbine of the impulse type as shown in Fig. 3, a diaphragm forming member 1 is prepared to receive and hold a plurality of fluid passage defining elements 2. The diaphragm forming member is made from one or more pieces of metal having an outer edge 6 being a locus having all points thereon radially and equally spaced from an axis to thereby define a circle and having oppositely disposed face portions 7 and 8. If the member 1 is made from more than one piece of metal, the pieces may be tack welded together so that the entire diaphragm can be made at the same time and all welding and machining operations hereinafter described will follow continuous circular paths. The completed diaphragm may be cut into segments for assembly within a turbine.

Figure 4:
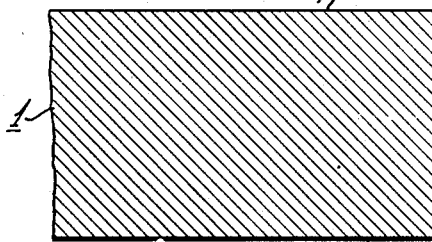
Fig. 4 is a fragmentary view of a portion of the periphery of a piece of metal having an outer surface defining at least a portion of a circle, this piece is to be prepared to receive fluid passage defining elements according to this invention.
Figure 5:
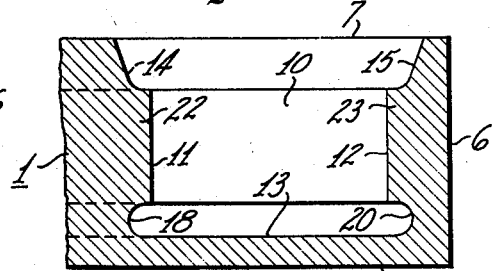
Fig. 5 is a fragmentary view in section of the member shown in Fig. 4 after certain machining operations have been performed to prepare this member for receiving fluid passage defining elements.

The diaphragm forming member 1 as shown in Fig. 4 is machined to provide the member with the configuration shown in Fig. 5. As shown in Fig. 5, a groove 10 is cut in the member 1 which extends arcuately about the member in spaced relation to the edge 6. The groove 10 is defined by inner and outer radially spaced wall surfaces 11, 12 and a bottom surface 13 extending radially between the inner wall 11 and the outer wall 12. A second arcuate groove 14 is defined by a surface extending between the inner wall surface 11 and the first face portion 7. A third arcuate groove 15 is defined by a surface extending between the outer wall surface 12 and the face portion 7. A fourth arcuate groove 18 is defined by a surface between the bottom surface 13 and the inner wall surface 11. A fifth arcuate groove 20 is defined by a surface between the bottom surface 13 and the outer wall surface 12. The groove 18 extends radially inward of the inner wall surface 11 and the groove 20 extends radially outward of the outer wall surface 12 and thereby provides a cavity having a radial dimension greater than the radial distance between the inner and outer wall surfaces 11 and 12. The surfaces defining grooves 14, 18 and 15, 20 define first and second land portions 22 and 23, respectively, for engaging opposite end portions 4 and 5 of fluid passage defining element 2 as shown in Fig. 6.

The diaphragm forming member 1 is shaped as shown in Fig. 5 by first cutting away material to form the first groove 10. Having cut the groove 10 into the member 1 the grooves 14, 15 and 18, 20 can then be cut into the walls 11 and 12 of the groove 10 to form the described configuration.

Figure 6:
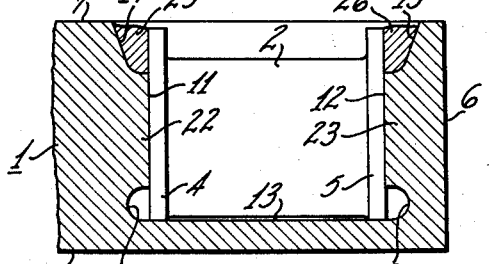
Fig. 6 is a fragmentary view in section showing the member shown in Fig. 5 with the fluid passage defining elements in place and after certain welding operations have been performed.

As shown in Fig. 6, the shaping of the diaphragm forming member 1 as thus far described provides space for the insertion of fluid passage defining element 2. These elements 2 are placed as shown in Fig. 6 with their end portions 4 and 5 resting upon the bottom surface 13 and with the land portions 22 and 23 engaging the opposite end portions 4 and 5 of the element 2. The diaphragm forming member 1 as thus far described therefore makes possible rapid insertion of a plurality of the elements 2 in the member 1 without the need for special devices or skill to obtain desired accurate alignment of each of the elements 2 since the member 1 is so shaped that it will engage and hold each element 2 in its proper position.

With the diaphragm forming member 1 prepared as shown in Fig. 5 the diaphragm may then be completed in the following manner. With the elements 2 inserted into the groove 10 of the member 1 as shown in Fig. 6, the radially spaced inner and outer portions 4 and 5 of the elements 2 coact to present a continuous array of surface elements to abut the inner and outer surfaces 11 and 12 and the bottom surface 13 of the groove 10 to partially enclose grooves 14 and 15 and to completely enclose grooves 18 and 20. The grooves 14 and 15 may then be filled with a bonding material, as by welding, as indicated at 25 and 26 to unite the diaphragm member 1 and portions of the elements 2 adjacent the grooves 14 and 15.

Figure 7:
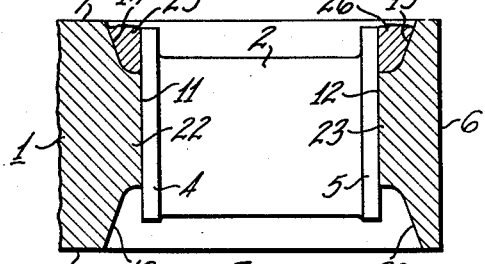
Fig. 7 is a fragmentary view in section of the member shown in Fig. 6 with fluid passage defining elements in place, certain welding operations having been performed and certain additional machining operations having been performed to remove metal shown in Figs. 4, 5 and 6, all according to this invention.
Figure 8:
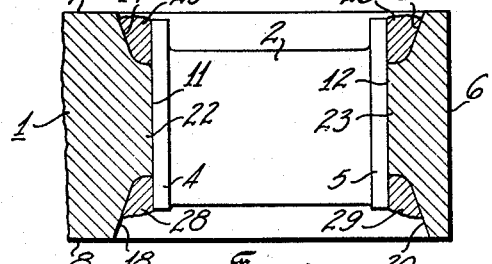
Fig. 8 shows a fragmentary view in section showing a fluid passage defining element in position with respect to a holding member and the welding operations having been completed.
Figure 9:
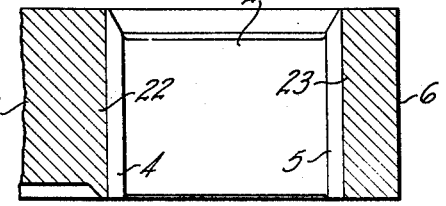
Fig. 9 shows a fragmentary view in section of a diaphragm for a steam turbine of the impulse type after the diaphragm has been completely assembled and finished machined.

With each of the elements 2 united to the member 1 by the bonding material 25 and 26 in the grooves 14 and 15, the member 1 is then shaped as shown in Fig. 7 to cut away the bottom of the cavity to expose the elements 2 and the grooves 18 and 20. The grooves 18 and 20 may then be filled with a bonding material 28, 29 to unite the member 1 and portions of the element 2 adjacent the grooves 18 and 20. The fluid passage defining elements as shown in Fig. 8 are firmly secured to the member 1 by the bonding material in the four grooves 14, 15, 18 and 20. The diaphragm is therefore ready for final finish machining to provide the diaphragm with the desired configuration which may be as shown in Fig. 9 where the blades 2 are shown as an integral part of the member 1. As shown in Fig. 3 fluid passages 30 defined by the elements 2 extend through the diaphragm member 1.

From the foregoing it will be apparent to those skilled in the art that the illustrated embodiment of the invention provides a new and improved method for making an article useful in a new and improved method for manufacturing fluid passage defining structures and accordingly accomplishes the object of the invention. On the other hand, it will also be obvious to those skilled in the art that the illustrated embodiments of the invention may be variously changed and modified for features thereof singly or collectively embodied in other combinations than those illustrated without departing from the spirit of the invention. Accordingly the disclosure herein is illustrative only and the invention is not limited thereto.

It is claimed and desired to secure by Letters Patent:

A method of constructing a fluid passage defining structure which comprises, providing a member having an outer edge, said outer edge being a locus having all points thereon radially and equally spaced from a single axis, and said member having oppositely disposed parallel face portions, shaping said member to provide in one face portion thereof a first arcuate groove defined by inner and outer spaced wall surfaces both radially spaced from and parrallel to said axis and a bottom surface extending radially between said inner and outer wall surfaces, said bottom surface providing a single plane surface between said inner and outer wall surfaces parallel to said face portion providing second and third circumferential grooves in said inner and outer wall surfaces adjacent said one face portion, machining to undercut a portion of said inner and outer wall surfaces adjacent said bottom surface to provide respectively a fourth and fifth arcuate groove affording an enlargement of said bottom surface, providing a plurality of fluid passage defining elements, said elements having spaced side portions parallel to each other and parallel to the central axis of the element passage, arranging said elements in said first groove with said side portions abutting said inner and outer wall surfaces and resting upon said bottom surface of said first groove to partially enclose said second and third grooves and to completely enclose said fourth and fifth grooves, filling said second and third grooves with a bonding material to unite said member and portions of said elements adjacent said second and third grooves, shaping said member by cutting away said bottom surface to expose said passages and said fourth and fifth grooves, and filling said fourth and fifth grooves with a bonding material to unite said member and portions of said surface elements adjacent said fourth and fifth grooves.

References Cited in the file of this patent
UNITED STATES PATENTS

| | | |
|---|---|---|
| 1,717,203 | Gottschalk | June 11, 1929 |
| 1,750,652 | Waller | Mar. 18, 1930 |
| 1,938,382 | Haigh | Dec. 5, 1933 |
| 2,299,449 | Allen | Oct. 20, 1942 |
| 2,316,813 | Schaper | Apr. 20, 1943 |
| 2,373,558 | Haigh | Apr. 10, 1945 |